Oct. 25, 1932.　　　C. F. ROSSETTER　　　1,884,261
BRAKE TESTING DEVICE FOR MOTOR VEHICLES
Filed Sept. 20, 1924　　3 Sheets-Sheet 1

Inventor:
C. F. Rossetter:
by Hazard and Miller
Attorneys

Oct. 25, 1932.  C. F. ROSSETTER  1,884,261
BRAKE TESTING DEVICE FOR MOTOR VEHICLES
Filed Sept. 20, 1924  3 Sheets-Sheet 2

Inventor:
C. F. Rossetter,
by Hazard and Miller
Attorneys

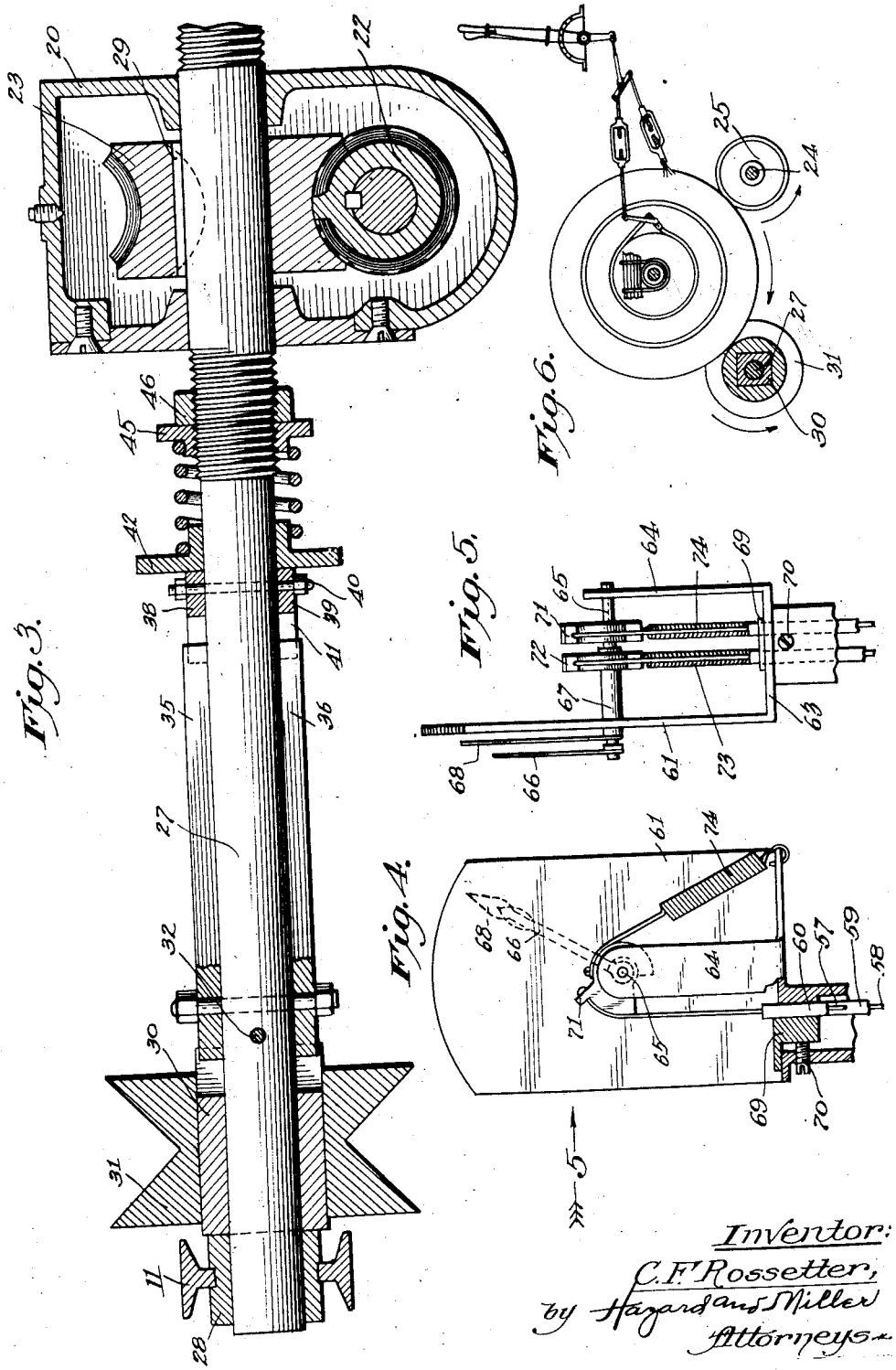

Patented Oct. 25, 1932

1,884,261

UNITED STATES PATENT OFFICE

CHARLES F. ROSSETTER, OF LOS ANGELES, CALIFORNIA, ASSIGNOR, BY MESNE ASSIGNMENTS, TO BENDIX-COWDREY BRAKE TESTER INC., A CORPORATION OF DELAWARE

BRAKE TESTING DEVICE FOR MOTOR VEHICLES

Application filed September 20, 1924. Serial No. 738,922.

This invention relates to brake testing devices and is especially adapted to test the brakes of a motor vehicle.

It is a broad primary object of this invention to provide a device which will simultaneously indicate and compare the braking power of the brakes mounted upon two wheels of a motor vehicle, such as an automobile.

It is a further object of this invention to provide a device which will drive two wheels of a motor vehicle simultaneously and at the same rate of rotation while the brakes upon those wheels are being applied, and to provide means for indicating and comparing the torque necessary to drive each wheel, thereby indicating the braking power of the respective brakes.

Figure 1:
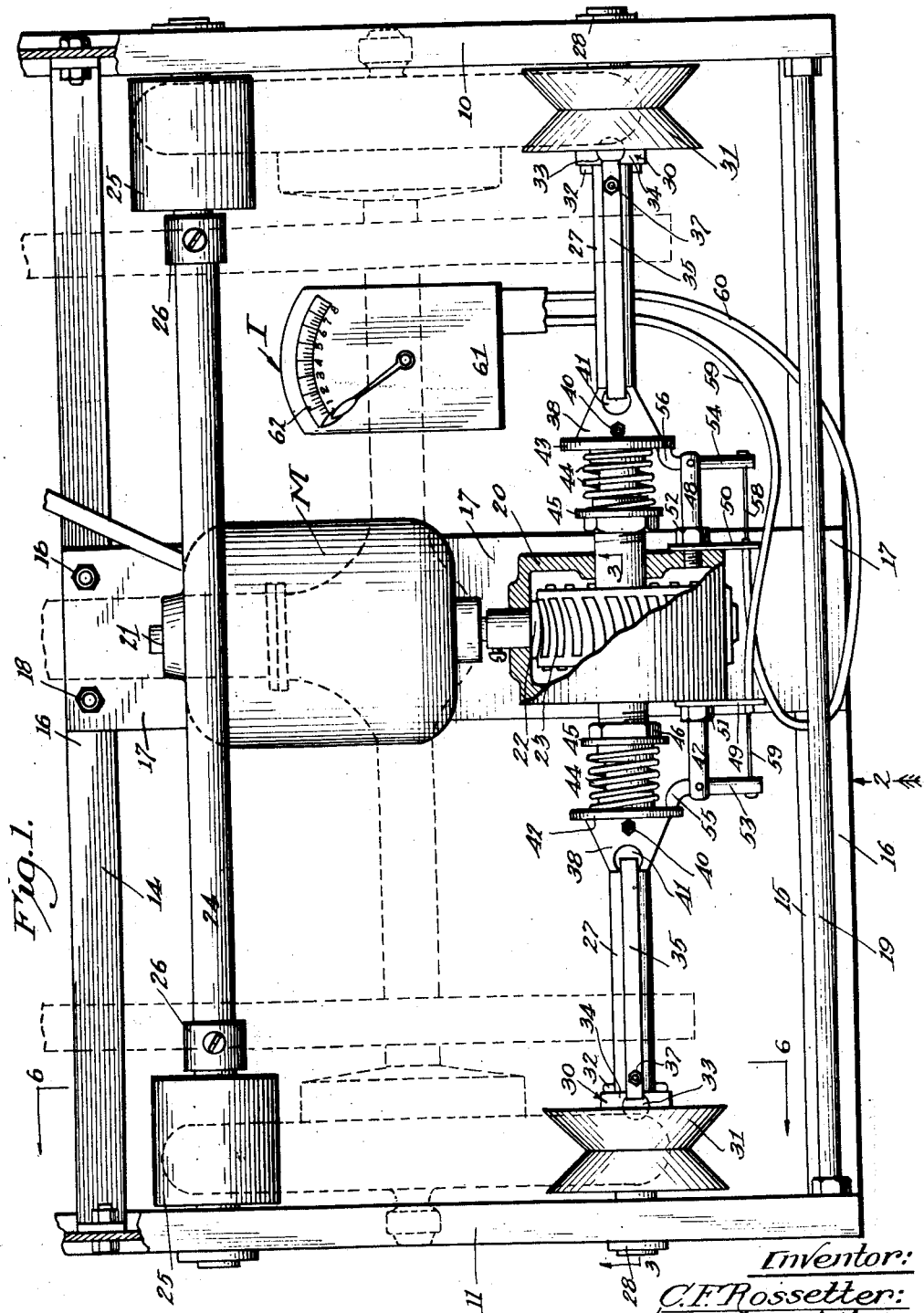
Figure 2:
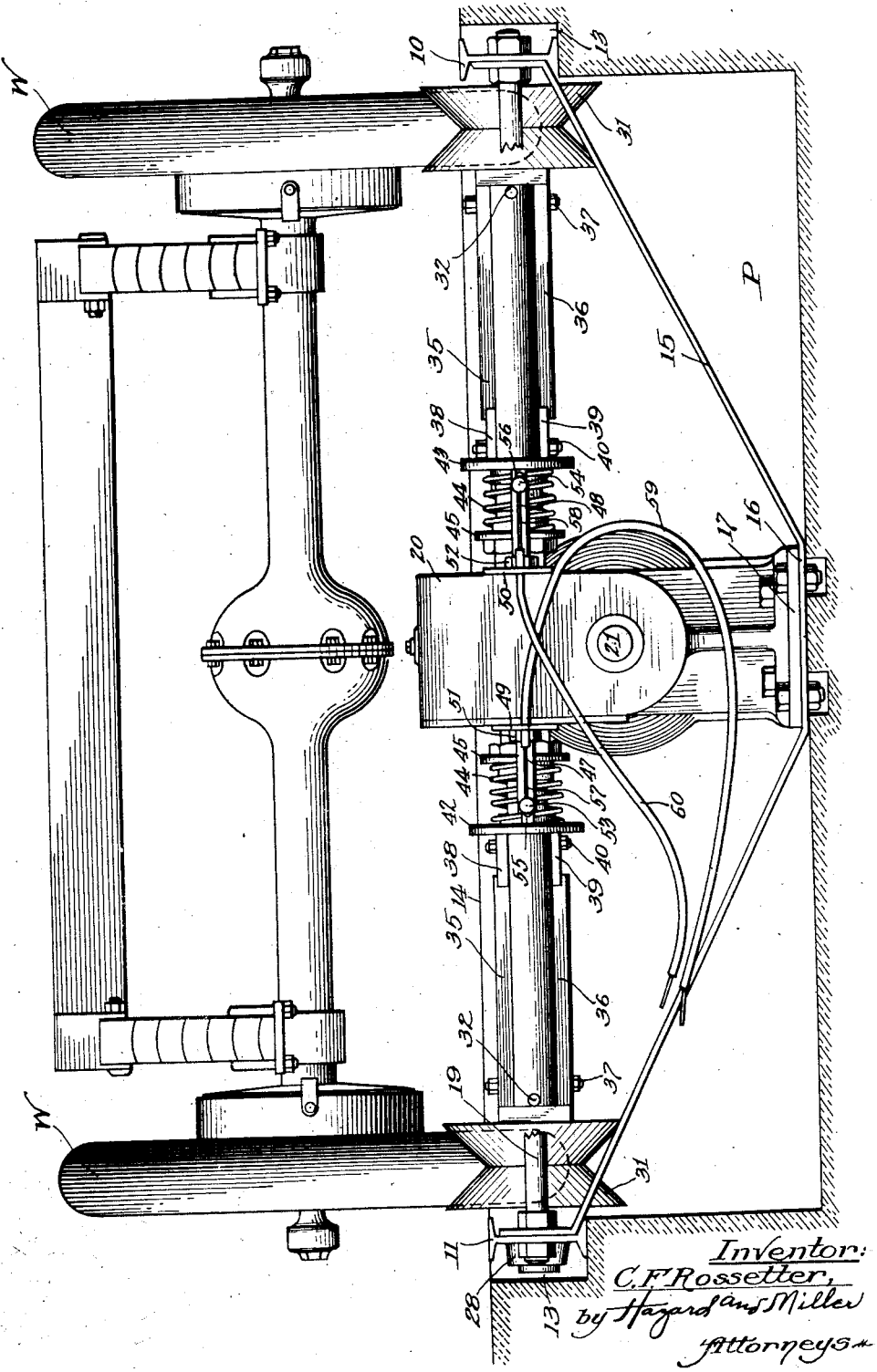

With the foregoing and other objects in view which will be made manifest in the following detailed description and pointed out in the appended claims, reference is had to the accompanying drawings for an illustrative embodiment of the invention, wherein:

Figure 1 is a top plan view of the improved brake testing device, parts being broken away and shown in section, Fig. 2 is a side elevation of the brake testing device shown in Fig. 1 taken in the direction indicated by the arrow 2 in Fig. 1, Fig. 3 is a vertical section taken substantially upon the line 3—3 of Fig. 1, Fig. 4 is a back view in elevation of the indicator which is used in connection with the brake testing device, Fig. 5 is a side elevation of the indicator shown in Fig. 4, and Fig. 6 is a section taken substantially upon the line 6—6 of Fig. 1.

Referring to the accompanying drawings wherein similar reference characters designate similar parts throughout, the improved brake testing device consists of a frame adapted to be set into a pit P which may be dug into the bottom of a garage floor so that a vehicle upon which it is desired to test the brakes may be conveniently run directly onto the brake testing device. This frame is formed of a pair of parallel I-bars 10 and 11 which rest in recesses 12 and 13 formed in the side walls of the pit P. Suitable cross members 14 and 15 are secured to the I-bars 10 and 11 and extend downwardly toward the bottom of the pit forming flat horizontal portions 16, to which a longitudinal plate 17 may be secured as by bolts 18. A bar 19 may extend horizontally across between the I-bars 10 and 11 so as to maintain the I-bars in correct spaced relation to each other. The bar 19 may also serve to secure the cross member 15 to the I-bars 10 and 11, as shown in Fig. 2.

An electric motor M, which may be of any preferred construction, is mounted upon the plate 17 and a housing 20 is also mounted upon the plate 17. The armature shaft 21 of the motor M has a worm 22 secured thereto, which is disposed within the housing 20 and is engageable with a worm wheel 23, also within the housing 20.

A shaft 24 has its ends secured in the I-bars 10 and 11 adjacent their forward ends and this shaft 24 carries suitable rollers 25 which are rotatable upon the shaft and held in proper position thereon by means of collars 26. A second shaft 27 has its ends journaled in the I-bars 10 and 11, as at 28. The second shaft 27 extends through the housing 20 and has the worm wheel 23 keyed thereto, as by a key 29. Sleeves or bushings 30 are loosely mounted upon the shaft 27 adjacent the ends thereof, which bushings have square exterior surfaces, as shown in Fig. 6. Rollers 31 are mounted upon the bushings 30 and are adapted to slide axially thereon. Each of the bushings 30 are maintained in position adjacent the bearings 28 by pins 32, which extend through the shaft 27.

Upon opposite sides of the bushings 30 circular recesses 33 are formed which provide portions 34 which engage the opposite sides of levers 35 and 36 which are pivoted, as by bolts 37, upon the top and bottom of the shaft 27. Cams 38 and 39 are pivoted, as by bolts 40, upon the top and bottom of the shaft 27, these cams being provided with circular recesses 41 which receive the opposite ends of the levers 35 and 36. Collars 42 and 43 are axially slidable upon the shaft 27 and are urged into engagement with the cams 38 and 39 by coil springs 44 disposed about the shaft 27 and compressed between the collars 42 and 43 and flange nuts 45 which are threadedly attached to the shaft 27 adjacent the housing 20. Lock nuts 46 may also be threaded onto the shaft 27 and maintain the flange nuts 45 in correct position thereon.

Arms 47 and 48 are threaded into the opposite sides of the housing 20, upon which suitable bracket arms 49 and 50 may be secured, as by lock nuts 51 and 52. Levers 53 and 54 are pivoted upon the arms 47 and 48, these levers 53 and 54 being provided with curved ends 55 and 56, which engage the collars 42 and 43 respectively. Flexible elements 57 and 58 are connected to the levers 53 and 54 and extend into flexible tubes 59 and 60 respectively, which have their ends secured to the bracket arms 49 and 50. The rollers 31 are provided with inclined peripheral surfaces so that each roller 31 has the appearance of a sheave wheel, or a roller having a peripheral groove therein.

The operation of the device is as follows: When it is desired to test the brakes of a vehicle, the vehicle is driven onto the frame of the brake testing device so that each wheel of the vehicle rests upon the rollers 25 and 31. The brakes of the vehicle are then applied and the motor M is started. The motor M rotates the worm 22 driving the worm wheel 23 and producing rotation of the shaft 27. The levers 35 and 36 being pivoted to the shaft 27 cause the bushings or sleeves 30 to rotate with the shaft 27, thereby causing the rollers 31 to rotate with the shaft 27 and producing rotation of the wheels W of the vehicle against the action of the brakes. Because of the fact that the brakes are applied, the rollers 31 and the bushings 30 will tend to be twisted or rotated upon the shaft 27. Such action will cause swinging movement of the levers 35 and 36, thereby producing rotation of the cams 38 and 39, which will push the collars 42 and 43 toward the housing 20 against the action of the coil springs 44. When the collars 42 and 43 are moved toward the housing 20 against the action of the coil springs 44, the levers 53 and 54 will be swung upon the arms 47 and 48 thereby producing movement of the flexible elements 57 and 58 within the tubes 59 and 60.

The flexible elements 57 and 58 are connected to an indicator, generally designated at I, which consists of a face 61, bearing suitable indicia 62. The face 61 has a bottom and rearwardly extending portion 63 formed integral therewith and a back 64. A spindle 65 has its ends journaled in the face 61 and the back 64 and carries a pointer 66 adapted to traverse the indicia 62 upon the face 61. A sleeve 67 is slidably mounted upon the spindle 65 and carries a second pointer 68, also adapted to traverse the indicia 62. The tubes 59 and 60 are secured to the bottom 63 of the indicator by a slidable shoe 69 which is clamped against the tubes by a set screw 70. The spindle 65 and the sleeve 67 have quadrants or sectors 71 and 72 rigidly secured thereto, and the ends of the flexible elements 57 and 58 are secured upon these quadrants, as shown in Fig. 4. Springs 73 and 74 are also secured to the quadrants 72 and 71 respectively and tend to keep the pointers 66 and 68 at zero position. As will readily be understood, when the collars 42 and 43 by axially sliding upon the shaft 27 cause the movement of the levers 53 and 54, the flexible elements 57 and 58 will be drawn through the tubes 59 and 60, thereby pulling downwardly upon the quadrants 71 and 72, causing movement of the spindle 65 and the sleeve 67 and their respective pointers 66 and 68.

If the brake upon the right wheel W of the vehicle is tighter than the brake upon the left wheel W, it will readily be understood that the right hand roller 31 will receive more torque or twist upon the shaft 27, thereby causing the right hand levers 35 and 36 to swing farther and producing greater rotation of the cams 38 and 39 and greater axial movement of the collar 43, so that the flexible element 58 will be drawn farther through its tube 60, causing greater movement of the pointer 68 from its zero position. Obviously the brake upon the right wheel W can then be loosened, or the brake upon the left wheel W may be tightened until both pointers 66 and 68 will substantially coincide. When the pointers 66 and 68 coincide, the brakes upon the wheels W will exert equal braking power, as will readily be understood.

The rollers 31 are adapted to slide axially upon the square sleeves or bushings 30, so as to enable the brake testing device to accommodate the vehicles of slightly different widths, it being understood that slight differences in the size of tires used by the vehicles will frequently make slight differences in the exact distance between the ground engaging surfaces of the wheels. Each wheel W rests upon both rollers 25 and 31, the roller 31 constituting a drive roller for the device and the roller 25 being merely a supporting or idler roller. As clearly shown upon the drawings each of the drive rollers 31 is so constructed as to have formed thereon a V-shaped peripheral groove. This is an important feature of the construction. It will be readily appreciated that in driving the vehicle wheels in order to make an accurate test, it is essential that there be no slippage between the drive rollers and the wheels. By making the drive rollers 31 with a V-shaped groove, the tire on the wheel engages upon two separate surfaces on each roller, as distinguished from the ordinary type of grooved roller where the wheel merely rolls on the bottom of the groove. By making the groove V- shaped, not only will the tire engage two separate surfaces so as to have two separate points of engagement with the roller, but it will also tend to wedge in the groove. It will be readily appreciated that this construction creates a very high co-efficient of friction between the tire and the roller, so that slippage between the tire and the roller is reduced to an absolute minimum.

It is seen that a brake testing device has been provided which consists of a frame upon which a vehicle is adapted to be driven so as to rest thereupon. A single motor is mounted upon the frame adapted to drive a shaft on the frame, causing drive rollers mounted upon the shaft to rotate the wheels of the vehicle simultaneously and at the same rate of rotation, thereby providing for adjustment of the brakes under normal conditions. Furthermore, I have provided a mechanism associated with the shaft for indicating the torque necessary to drive the drive rollers and for comparing the torque necessary to rotate each wheel of the vehicle while its respective brake is applied. Although in some cases, it may be found desirable to employ only the levers 35 and the cams 38, I find that it is advantageous to employ the levers 36 and the cams 39 so that the cams 38 and 39 may engage the collars 42 and 43 at substantially diametrically opposite points, thereby eliminating or reducing any tendency of the collars 42 and 43 to bind upon the shaft 27.

It will be understood that various changes in the detail of construction may be made without departing from the spirit or scope of the invention as defined by the appended claims.

I claim:

1. A brake testing device for vehicles comprising a frame, two pairs of aligned rollers mounted upon said frame upon which are adapted to rest two wheels of a vehicle, means for simultaneously causing one roller of each pair to rotate its respective wheel, and means for indicating the torque necessary to rotate each wheel.

2. A brake testing device for vehicles comprising a frame, two pairs of aligned rollers mounted upon said frame upon which are adapted to rest two wheels of a vehicle, a motor operatively connected to cause one roller of each pair to simultaneously rotate said wheels at the same rate of rotation, and means for indicating for purposes of comparison the torque necessary to rotate each wheel.

3. A brake testing device for vehicles comprising a frame, a pair of rollers mounted upon said frame at opposite sides thereof upon which are adapted to rest two wheels of a vehicle, a shaft connecting said rollers, a motor operatively connected for rotating said shaft, thereby causing said rollers to rotate said wheels, and means associated with said shaft for indicating and comparing the torque necessary to rotate each wheel.

4. A brake testing device for motor vehicles comprising a frame, a roller mounted upon said frame upon which is adapted to rest a wheel of a vehicle, a shaft upon which said roller is mounted, a motor operatively connected for driving said shaft, said roller being loosely mounted upon said shaft, a lever mounted upon said shaft adapted to cause said roller to rotate with the shaft, a collar slidable on the shaft and a spring mounted upon said shaft, said collar being adapted to slide axially upon said shaft against said spring upon actuation of said lever, and means actuated by said collar for indicating the torque necessary to drive said wheel.

5. A brake testing device for motor vehicles comprising a frame, a motor mounted upon said frame, a shaft connected to and adapted to be driven by said motor, rollers carried by said shaft adapted to engage and drive the wheels of a vehicle, and means associated with said shaft adapted to indicate for purposes of comparison the torque necessary to rotate each wheel.

6. A brake testing device for motor vehicles comprising a frame, a motor mounted upon said frame, a shaft connected to and adapted to be driven by said motor, rollers carried by said shaft adapted to engage and drive the wheels of a vehicle, levers mounted upon said shaft adapted to be actuated upon movement of said rollers relative to the shaft, and means actuated by said levers for indicating for purposes of comparison the torque necessary to drive each wheel.

7. A brake testing device for motor vehicles comprising a frame, a motor mounted upon said frame, a shaft operatively connected to be driven by said motor, rollers carried by said shaft adapted to engage and drive the wheels of a vehicle, levers mounted upon said shaft adapted to be actuated upon movement of said rollers relative to the shaft, means actuated by said levers for indicating for purposes of comparison the torque necessary to drive each wheel, and idler rollers mounted upon said frame in alignment with the first mentioned rollers adapted to cooperate with said first mentioned rollers to support said wheels of the vehicle.

8. A brake testing device for motor vehicles comprising a frame, a motor, a shaft mounted upon said frame connected to and adapted to be driven by said motor, rollers carried by said shaft adapted to be engaged and rotate the wheels of a vehicle, levers mounted upon said shaft adapted to cause said rollers to rotate with said shaft, said levers being actuated upon relative movement of said rollers with respect to said shaft, cams mounted upon said shaft operable by said levers, collars slidable upon said shaft adapted to be actuated by said cams, an indicating device and means connecting said collars to said indicating device so that it may indicate the torque necessary to drive said rollers causing rotation of the wheels of the vehicle.

9. A brake testing device comprising means for simultaneously rotating two wheels of a vehicle at the same rate of rotation, and means for indicating for purposes of comparison the torque necessary to rotate said wheels, said means comprising an indicator, a pair of movable hands upon said indicator, and means for connecting each of said hands to the first mentioned means.

10. A brake testing device for motor vehicles and the like comprising rotating means for simultaneously rotating two wheels of a vehicle, and torque indicating means coupled with said rotating means whereby the torque necessary to rotate each wheel may be simultaneously and independently determined.

11. A brake testing device comprising means engageable upon each of two wheels of a vehicle for simultaneously rotating them at the same speed of rotation, and means for simultaneously and independently indicating the torque necessary to rotate each wheel.

12. A brake testing device comprising two rollers against each of which a wheel of a vehicle is adapted to rest, a common source of power, means connecting each roller to the source of power so that the rollers may be rotated simultaneously at the same speed of rotation, and means associated with each roller for indicating the torque necessary to rotate it.

13. A brake testing device comprising two pairs of parallel rollers, on each pair of which a wheel of a vehicle is adapted to rest, a common source of power, means connecting one roller of each pair to the source of power so that each of the last mentioned rollers may be driven simultaneously at the same speed of rotation, and means associated with each of the last mentioned rollers whereby the torque necessary to rotate one of the mentioned rollers may be determined simultaneously with the determination of the torque necessary to rotate the other roller but independently of it.

14. In a brake testing device, a shaft, two rollers loosely mounted upon said shaft, means mounted upon the shaft for yieldably resisting rotation of each roller relatively to the shaft, indicating devices each of the last mentioned means being connected to said indicating device so that the torque necessary to prevent each roller from moving relatively to the shaft may be simultaneously and independently determined.

15. A brake testing device comprising two parallel rollers on which a wheel of a vehicle is adapted to rest, a shaft on which one of said rollers is loosely mounted, means for rotating said shaft, levers pivoted upon the shaft engaging said rollers for yieldably resisting its rotational movement relatively to the shaft, cams pivoted upon said shaft operable by said lever, a collar slidable upon the shaft adapted to be engaged by said cams to slide it, a spring keeping said collar in engagement with said cams, and means for measuring the distance said collar is moved by said cams so as to indicate the torque necessary to prevent relative rotation between the roller and the shaft.

16. A brake testing device comprising a shaft, means for rotating said shaft, two rollers adapted to be driven by said shaft against which two wheels of a vehicle are adapted to rest, and two torque indicating devices, one being associated with each roller for indicating the torque necessary to rotate each roller by said shaft.

17. In a vehicle testing device, two pairs of rollers, upon each pair of which a wheel of a vehicle is adapted to rest, one roller of each pair being cylindrical in form and the other roller of each pair having a peripheral groove formed thereon, the grooved rollers being axially adjustable as and for the purpose described.

18. A brake testing device comprising two rollers against each of which a wheel of a vehicle is adapted to rest, means for simultaneously rotating said rollers at the same speed of rotation, and means for simultaneously and independently indicating the torque required to rotate each roller.

19. A brake testing device comprising two pairs of aligned rollers upon each of which pairs a wheel of a vehicle is adapted to rest, means for simultaneously rotating one roller of each pair at the same speed of rotation, and means for simultaneously and independently indicating the torque required to rotate the mentioned roller of each pair, the mentioned roller of each pair being grooved and being axially adjustable to accommodate various vehicles.

20. A brake testing apparatus comprising wheel turning means adapted to engage the wheel of an automobile to revolve the same, a revoluble member relatively fixed to said wheel turning means, a revoluble member adapted to be driven and capable of yielding axially, means interposed between said members adapted to transmit the drive from the yielding member to the fixed member and to cause said yielding member to yield axially in direct proportion to the resistance offered to turning movement by the wheel, and indicating means operated by the yielding movement of said yieldable member.

21. A brake testing apparatus comprising wheel turning means adapted to engage the wheel of an automobile to revolve the same, a revoluble member relatively fixed to said wheel turning means, a revoluble member adapted to be driven and capable of yielding axially, means interposed between said members adapted to transmit the drive from the yielding member to the fixed member and to cause said yielding member to yield axially in direct proportion to the resistance offered to turning movement by the wheel, and means operated by the yielding movement of the yieldable member at a greatly increased ratio to indicate the yielding movement of the yielding member.

22. A brake testing apparatus comprising wheel turning means adapted to engage the wheel of an automobile to revolve the same against the action of its brake, a member relatively fixed to the wheel turning means, a yieldable member adapted to be driven, a motor connected to said yieldable member to drive the same, means interposed between the fixed member and the yieldable member to transmit the drive to the fixed member from the yieldable member and causing the yieldable member to yield in direct proportion to the torque required to turn the wheel and indicating means operated by the yielding movement of said yieldable member.

23. A brake testing apparatus comprising wheel turning means adapted to engage an automobile wheel to revolve the same against the action of its brake, a revolving member relatively fixed to said wheel turning means, a second revolving member arranged in axial alignment with the first one to revolve concentrically therewith, means for revolving the second member, means interposed between said members adapted to permit a limited amount of relative rotation therebetween but to transmit a drive from the second member to the first member, means causing axial movement of said second member upon relative rotation between said members, means resisting such relative rotation but permitting same in direct proportion to the resistance offered to turning by the wheel, and means for indicating the axial movement of said second member.

24. A brake testing apparatus comprising wheel turning means adapted to engage an automobile wheel to revolve the same against the action of its brake, a revolving member relatively fixed to said wheel turning means, a second revolving member arranged in axial alignment with the first one to revolve concentrically therewith, means for revolving the second member, means interposed between said members adapted to permit a limited amount of relative rotation therebetween but to transmit a drive from the second member to the first member, means causing axial movement of said second member upon relative rotation between said members, means resisting such relative rotation but permitting same in direct proportion to the resistance offered to turning by the wheel, and means operated by the axial movement of the second member at a greatly increased ratio to indicate the axial movement of said second member.

25. A brake testing machine comprising a single power means for simultaneously rotating a plurality of vehicle wheels against brake resistance and means for simultaneously and individually measuring the brake resistance of said wheels.

26. In a brake testing machine, the combination of a plurality of driving rollers each arranged to impart rotation against brake resistance to a vehicle wheel, a single means for driving said rollers, and means associated with each driving roller for simultaneously and individually measuring the brake resistance of the driven wheel.

In testimony whereof I have signed my name to this specification.

CHAS. F. ROSSETTER.